W. N. BLANCHARD.
GOGGLES.
APPLICATION FILED MAR. 20, 1918.
1,308,477.
Patented July 1, 1919.
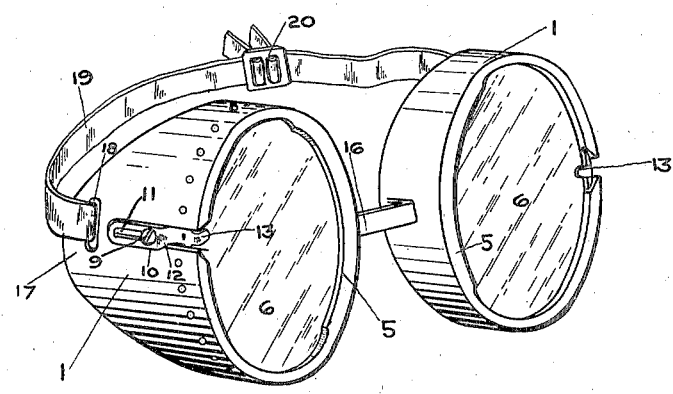
FIG. I.
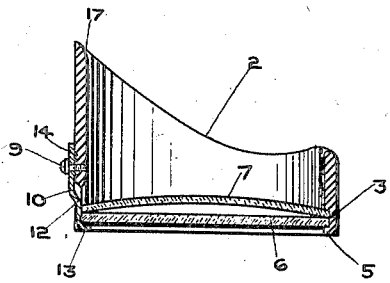
FIG. II.
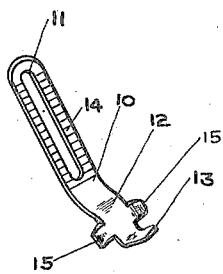
FIG. III.
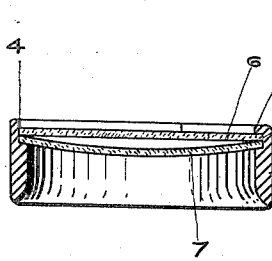
FIG. IV.
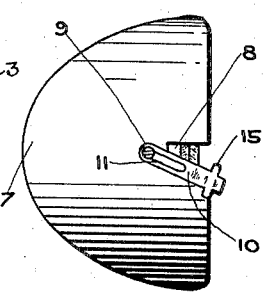
FIG. V.
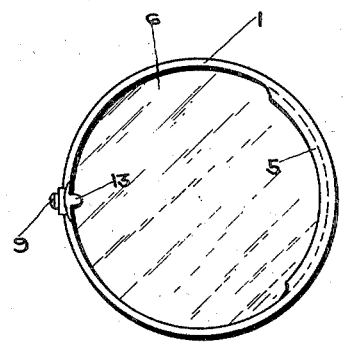
FIG. VI.
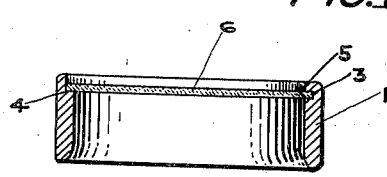
FIG. VII.
INVENTOR
WILLIAM N. BLANCHARD
BY
H. H. Styll, A. H. Parsons
ATTORNEYS

UNITED STATES PATENT OFFICE.

WILLIAM N. BLANCHARD, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

GOGGLES.

1,308,477.  Specification of Letters Patent.  Patented July 1, 1919.

Application filed March 20, 1918. Serial No. 223,563.

*To all whom it may concern:*

Be it known that I, WILLIAM N. BLANCHARD, a citizen of the United States, residing at Southbridge, in the county of Worcester and State of Massachusetts, have invented certain new and useful Improvements in Goggles, of which the following is a specification.

This invention relates to new and useful improvements in goggles, and more particularly to that type of goggle which is especially adapted for use by smelters and has improved means whereby the lenses in the goggles can be quickly and readily placed in position within the frames or removed as desired.

Another object of the present invention is to provide what is particularly known as a smelter's goggle, the frames of which are provided with removable lenses of such character as to protect the eyes from the intense glare of the heat coming from the smelting pots or furnaces. It is a well-known fact that in smelting plants a considerable amount of heat is used and the glare from this heat is unusually hard upon the eyes, and it is, therefore, my purpose to provide a protection goggle for use in protecting the eyes against this glare.

A still further object of the present invention is the provision of a pair of goggles wherein the lenses are removably arranged within the eye cups or frames and the frames provided with means whereby these lenses are securely held against displacement when in their proper positions, but at the same time may be quickly and readily removed to be replaced by new ones when so desired.

With the above and other objects in view the invention consists in the novel features of construction and the combination and arrangement of parts hereinafter more fully set forth, pointed out in the claims, and shown in the accompanying drawings, in which—

Figure I is a perspective view of a pair of goggles constructed in accordance with my invention;

Fig. II is a longitudinal sectional view taken through one of the frames or eye cups;

Fig. III is a detailed perspective view of the fastening member which retains the lenses within the frames or eye cups;

Fig. IV is a longitudinal sectional view taken at right angles to the view in Fig. II;

Fig. V is a side elevation of one of the frames or eye cups illustrating the retaining member in a position releasing the lenses; and Fig. VI is a front elevation of one of the frames or eye cups, showing the lenses in their proper positions and the fastening member engaged therewith.

Fig. VII is a longitudinal sectional view illustrating a modified form of the invention.

In the construction of a pair of goggles which include the novel features of my invention I employ a pair of eye cups 1, preferably formed of hard rubber or any similar fibrous material which will be light in weight, durable, and easily made into the desired shape. One end of each of these eye cups is preferably curved as shown at 2 to conform to the shape of the face so that they may be readily fitted over the eyes. The other ends of the eye cups are provided with an interior groove 3, the outer wall portion of said groove being removed around part of the circumference of the eye cup thus leaving a lip or overhanging flange 5 beneath which the lenses 6 and 7 are engaged to retain them in position within the eye cups.

In order to provide additional means for removably retaining the lenses within the eye cups I form at one side of the eye cups, preferably the outside, a longitudinal opening or slot 8, and secured to the eye cups at the inner end of this opening or slot 8 are the adjusting pins 9, preferably threaded into the walls of the eye cups, and mounted for sliding movement thereon are the plates 10 having slots 11 formed therein to receive the pins 9. The heads of said pins being substantially wider than the slot 11, the plates 10 will be securely held in their adjusted position upon the outer surface of the eye cups.

The plates 10 are provided adjacent one end thereof, on the end opposite the slot, with an offset 12 thus projecting one end of the plate in a plane parallel with the opposite end so that the projecting end is disposed within the opening or slot 8; and the extreme outer end thereof is bent or curved inwardly to form a retaining finger 13 which extends inwardly over the outer face of the lens 6 whereby to retain the lenses in position within the eye cups.

In the construction of my improved goggles, I provide a space for two lenses in each one of the eye cups, and it will be apparent that the lens 7 may be either a plano lens or a correction lens, while the lens 6 is a lens which will relieve the eyes from the glare radiating from the smelting parts or furnaces. In placing these lenses in position within the eye cups, they are first arranged within the groove 3, one side of the lenses being disposed beneath the lip or flange 5 and the other side dropped onto the seat 4 and the plate 10 moved upon the pin 9 until the flange or finger 13 engages with the outer face of the lens 6. The screw pin 9 is then tightened so that the plate is coengaged or forced against the outer wall of the eye cups to retain the finger 13 in position to prevent accidental removal of the lenses. It will be noted that the inner face of the plate 10 is provided on opposite sides of the slot 11 with a corrugation 14 which will bite into the outer surface of the eye cups and thus prevent any sliding movement on the part of the plate when the screw pin 9 has been tightened into position.

The end of the plate which carries the finger 13 is provided with oppositely projecting arms 15 adapted for engagement with the edges of the lenses so as to prevent any tilting or turning movement of the plate 10 when in its operative position. From this it will be apparent that when it is desired to remove either of the lenses 6 and 7 or both of the lenses simultaneously, the screw pin 9 is loosened up so that the plate 10 may be readily removed outwardly into a position as illustrated in Fig. V. The lenses can then be readily removed from position beneath the retaining flange 5 and either one or both of the lenses can be readily replaced by a new one or the same lenses put back into position again.

The eye cups 1 are connected by means of a bridge member 16 which in the present instance is illustrated as in the form of a strap which may be of any desirable material containing sufficient flexibility to permit the eye cups to readily conform to the outline of the face of the wearer. The extended portions 17 of the eye cups are each provided with slots 18 in which are secured the ends of the retaining straps or temple members 19, said members being connected at their ends by a suitable buckle or other fastening device as illustrated at 20. From the foregoing description taken in connection with the accompanying drawings it will be readily apparent that I have provided a substantially novel form of goggle especially adapted for use by smelters or other persons subject to an intense glare from a heated furnace or the like to fully protect the eyes from this glare. Furthermore, it will be apparent that the manner of detachably arranging the lenses within the eye cups of these goggles is such that these lenses may be quickly and readily removed to be replaced by new ones or for any other desired purpose.

I claim:

1. The combination with a frame having a lens-receiving seat, of a movable keeper attached to one side of the frame and adapted for engagement with a lens to retain the same in position on the seat, a screw pin carried by the frame and engaging the keeper whereby to lock the same in position.

2. The combination with a frame, having a lens receiving seat, of a stationary keeper at one side of the frame and a movable keeper at the opposite side of the frame for retaining a lens in position on the seat, said movable keeper being provided with a roughened surface for engagement with the frame to prevent any relative movement of the keeper with respect to the frame when locked in position.

3. The combination with a frane, having a lens receiving seat, of a movable keeper attached to one side of the frame for engagement with a lens to retain the same in position on the seat, said keeper being provided with a longitudinal slot and a securing pin carried by the frame for engagement within the slot whereby to lock the keeper in position.

4. The combination with a frame, having a lens receiving seat, of a stationary keeper at one side of the frame, a movable keeper at the opposite side of the frame for engagement with the lens, a finger at the outer end of the keeper for engagement over the outer face of the lens, and oppositely projecting arms carried by the keeper adjacent the finger for engagement with the edge of the lens, as and for the purpose set forth.

In testimony whereof I have affixed my signature, in the presence of two witnesses.

WILLIAM N. BLANCHARD.

Witnesses:
H. E. COLEMAN,
A. S. CANN.